March 15, 1966   C. R. DE VANE, JR., ETAL   3,240,470
SEMI-TRAILER LANDING GEAR ASSEMBLY
Filed Nov. 21, 1963   4 Sheets-Sheet 1
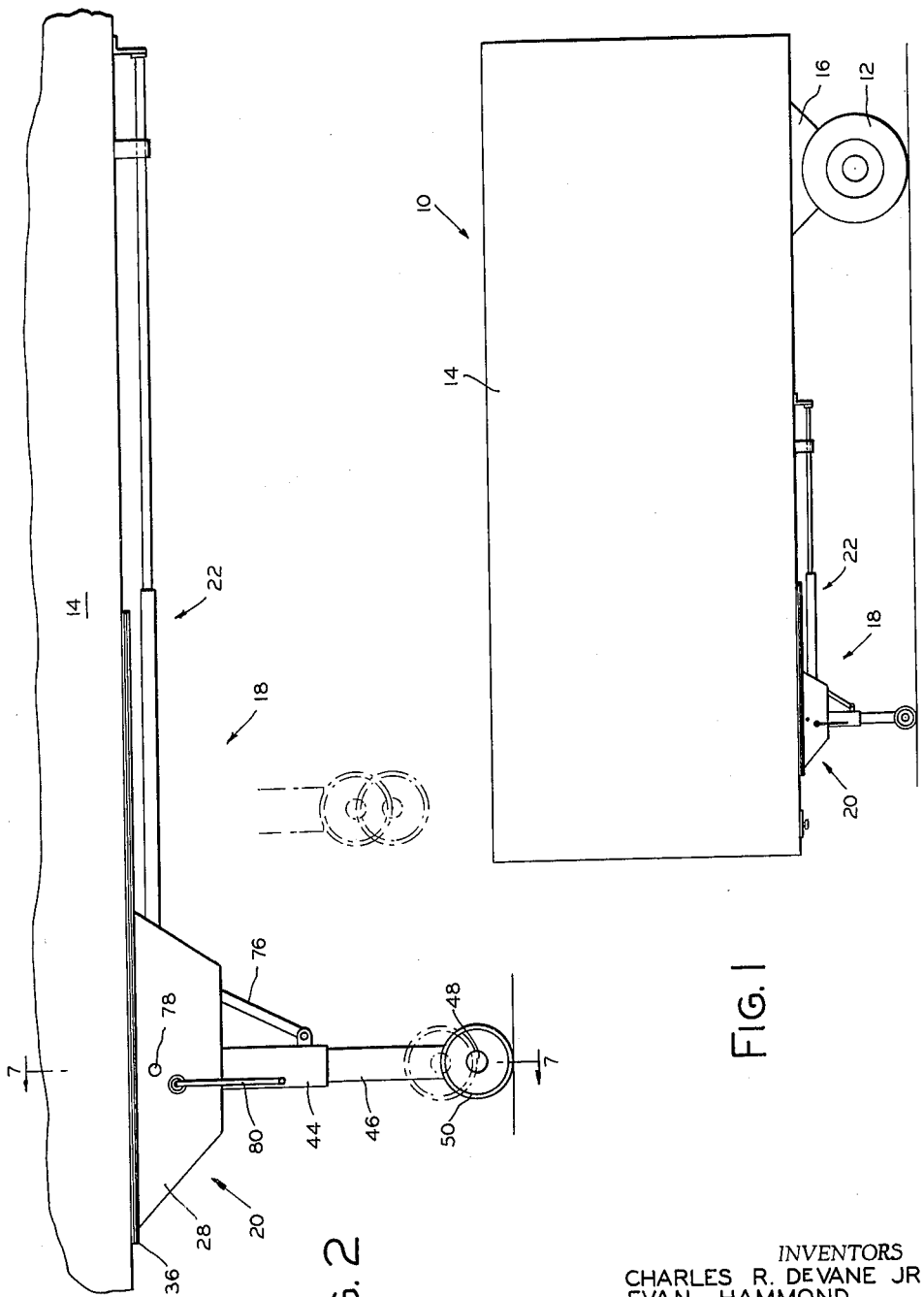
INVENTORS
CHARLES R. DEVANE JR.
EVAN HAMMOND
BY
Kenneth C. Witt
ATTORNEY March 15, 1966    C. R. DE VANE, JR., ETAL    3,240,470
SEMI-TRAILER LANDING GEAR ASSEMBLY
Filed Nov. 21, 1963    4 Sheets-Sheet 2

INVENTORS
CHARLES R. DEVANE JR.
EVAN HAMMOND
BY
*Kenneth C. Witt*
ATTORNEY

March 15, 1966   C. R. DE VANE, JR., ETAL   3,240,470
SEMI-TRAILER LANDING GEAR ASSEMBLY
Filed Nov. 21, 1963                                4 Sheets-Sheet 3

INVENTORS
CHARLES R. DEVANE JR.
EVAN HAMMOND
BY
*Kenneth C. Witt*
ATTORNEY

March 15, 1966  C. R. DE VANE, JR., ETAL  3,240,470
SEMI-TRAILER LANDING GEAR ASSEMBLY
Filed Nov. 21, 1963  4 Sheets-Sheet 4

INVENTORS
CHARLES R. DEVANE JR.
EVAN HAMMOND
BY
Kenneth C. Witt
ATTORNEY

United States Patent Office 3,240,470
Patented Mar. 15, 1966

3,240,470
SEMI-TRAILER LANDING GEAR ASSEMBLY
Charles R. De Vane, Jr., and Evan Hammond, Michigan City, Ind., assignors to Clark Equipment Company, a corporation of Michigan
Filed Nov. 21, 1963, Ser. No. 325,270
2 Claims. (Cl. 254—86)

This invention relates to landing gear assemblies for semi-trailers, and more particularly to such assemblies in which a retractable landing gear is arranged to move longitudinally along the semi-trailer during extension or retraction of the ground engaging portion of the landing gear.

The semi-trailer which is being referred to herein forms a part of the so-called "semi-trailer truck" that is commonly seen on the highways. A semi-trailer truck ordinarily includes a highway tractor unit which pulls a semi-trailer unit that may vary in length from 24 feet to 40 feet or longer. Hereinafter these units will be referred to as tractors and trailers. The tractor and trailer are connected to each other by means of a pivotal connection called a fifth wheel hitch, and can be disconnected from each other at this point. Since a trailer of the type contemplated herein ordinarily has supporting wheels adjacent the rear end thereof only, some means must be provided for supporting the front end of the trailer when the trailer is not supported by a tractor. To this end trailers usually are equipped with a landing gear, of which many types are known, which serves to support the front end of the trailer when it is not supported by a tractor. In order to prevent interference between the landing gear and the ground when the trailer is being supported by a tractor, the landing gear is made so that the ground engaging portion is retractable. Also, the landing gear must be located on the trailer far enough to the rear of the tractor so that there is sufficient clearance for horizontal pivotal movement between the tractor and trailer to permit disposing the two units at substantially 90° relative to each other during maneuvering of the two units when, for example, the trailer is being backed up to a loading dock.

It is sometimes desirable to hitch a relatively short length trailer, e.g., 27 feet in length, to a tractor with a long wheel base. In order to have sufficient clearance for maneuvering the two units, the landing gear may have to be located as much as 11.6 feet back from the front end of the trailer. However, the trailer might be unstable and tend to tip over forwardly under certain loading conditions if supported by the landing gear located so far back from the front end of the trailer. In order to provide an arrangement that is stable from the standpoint of preventing the trailer from tipping over forwardly, the landing gear should be positioned approximately 8.6 feet back from the front end of the trailer. Thus, the landing gear must occupy a position, in this case, which is three feet forward of the position that it must occupy to provide sufficient clearance for maneuvering, as explained hereinabove. Consequently, it is necessary to have a landing gear that is not only retractable, but also can be moved readily between two longitudinally spaced apart positions on the trailer. There is at least one such landing gear presently available commercially; however, this landing gear is raised or lowered through the action of one mechanism and moved longitudinally through the action of another separate mechanism. Such an arrangement of mechanisms is undesirable from the standpoint of safety and prevention of damage to the landing gear. For example, the operator may forget to move the landing gear rearwardly or fully to the rearmost position of the landing gear following retraction of the landing gear with the result that the landing gear is damaged during pivotal movement between the trailer and tractor due to insufficient clearance between the two units. More seriously, the landing gear may be extended upon disconnection of the trailer from the tractor, but, through inadvertence or otherwise, not moved to its forwardmost position. As a result, the trailer is in an unstable position, as pointed out previously, and may tip over forwardly, especially if a lift truck is being used to load or unload the trailer and is driven into the trailer to a point forward of the landing gear. Clearly, should the trailer tip over forwardly serious damage could result to the trailer and any cargo contained therein as well as personal injury to anyone in or near the trailer. In view of the foregoing, it is a principal object of our invention to provide a landing gear assembly in which the forward and rearward movements of the landing gear are coordinated with the extension and retraction movements of it.

Another object of our invention is to provide a landing gear assembly which is movable between an extended forward position and a retracted rearward position through actuation of a single mechanism.

Still another object of our invention is to provide an improved landing gear assembly that is safer to use than previously known landing gear assemblies of the same type.

Yet another object of our invention is to provide an assembly having a landing gear in which the ground engaging portion moves only vertically during initial retraction, and then moves both vertically and longitudinally during further retraction.

In carrying out our invention in a preferred embodiment we provide a landing gear that is slidably connected to a trailer for longitudinal movement relative thereto. The landing gear includes a ground engaging member which is actuatable vertically and a screw and nut mechanism operable by a hand crank to actuate the ground engaging member vertically. Rotatably connected to the landing gear is a screw which is operably connected to the hand crank for rotation upon operation of the hand crank. The screw threadably engages a nut which is slidably connected to the trailer for longitudinal movement relative thereto. A pair of stops limit the forward and rearward longitudinal movement of the nut.

The above and other objects, features and advantages of our invention will become more readily apparent to one skilled in the art from the following detailed description when taken in conjunction with the accompanying drawing wherein:

FIGURE 1 shows our invention used in conjunction with a trailer,

FIGURE 2 is a side elevation on an enlarged scale of our invention,

Figure 3:
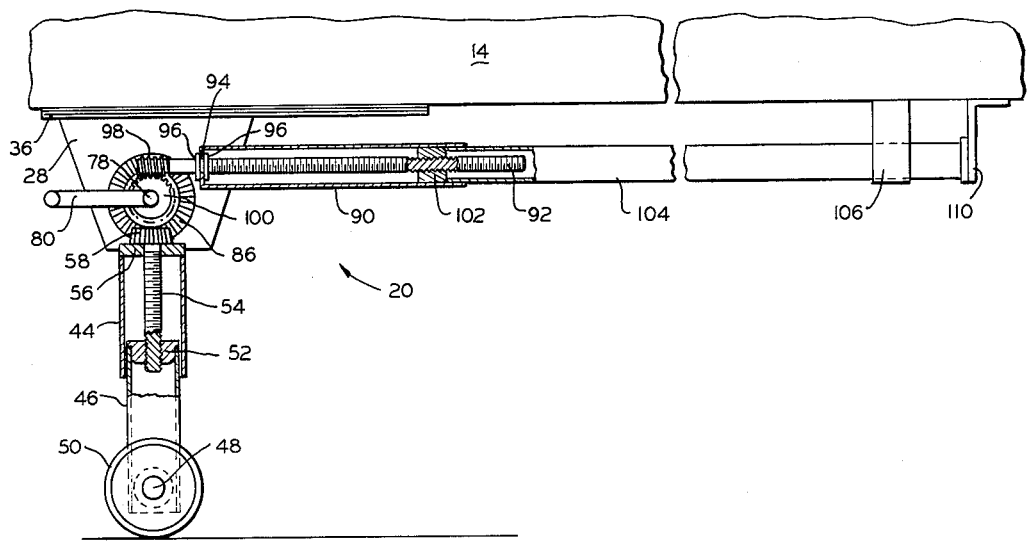
FIGURES 3, 4, 5 and 6 are schematic views of our invention showing to advantage the relationship of various parts thereof in various positions of operation.

Referring to FIG. 1, there is shown a trailer 10 which is supported at the rear end thereof by ground engaging wheels 12, only one of which is shown, which are connected to opposite ends of an axle, not shown. The axle is connected to a body 14 of the trailer by means of any suitable suspension 16. The trailer 10 is supported at the front end thereof by means of a landing gear assembly 18 which is connected to the underside of body 14. The landing gear assembly 18 will be seen to include a landing gear 20 and mechanism 22 for moving landing gear 20 longitudinally relative to the trailer body 14.

Figure 7:
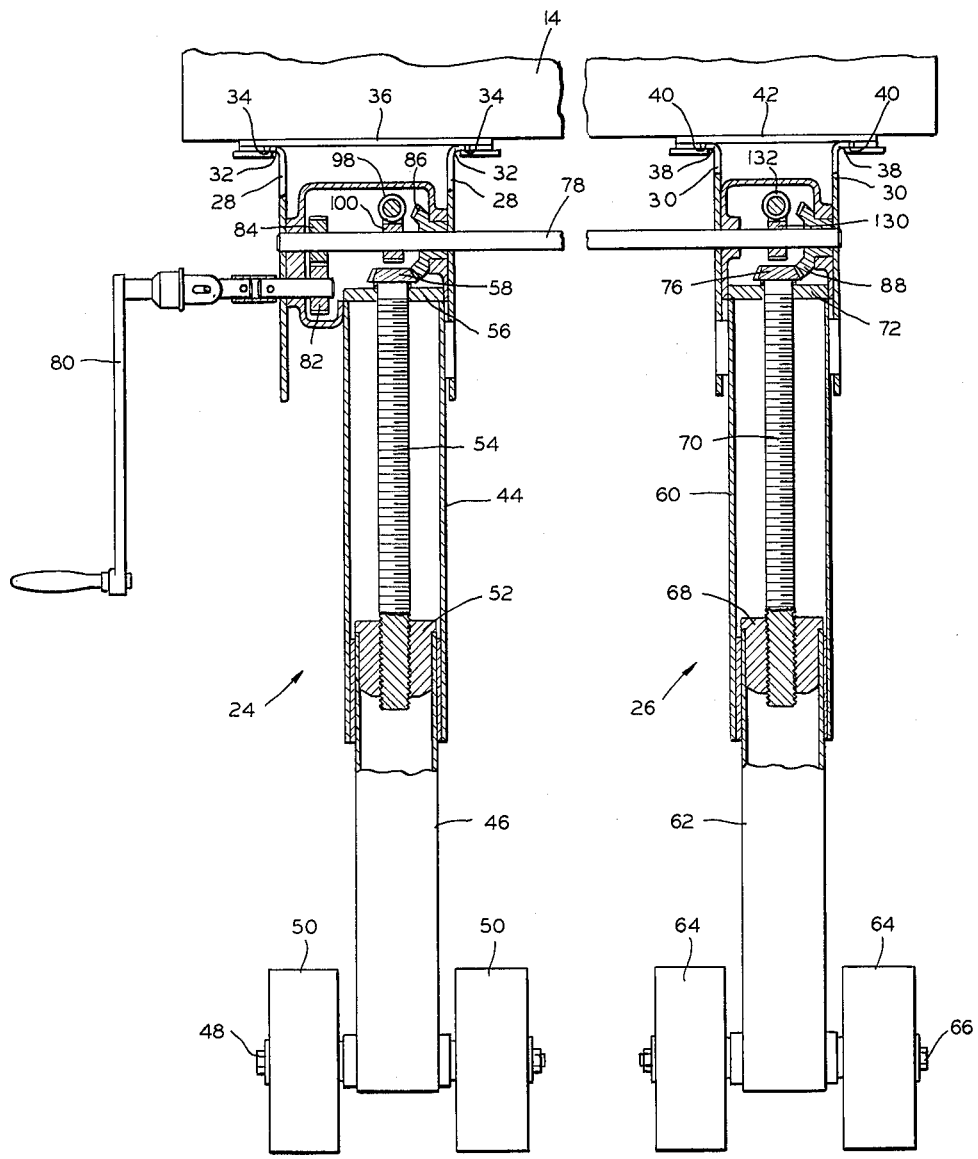
FIGURE 7 is a partial sectional view on an enlarged scale taken along line 7—7 of FIG. 2.

Referring now specifically to FIG. 7, the landing gear 20 includes a pair of legs 24 and 26 which are connected respectively to pairs of plates 28 and 30. Plates 28 each have an outwardly extending flange 32 at the upper end thereof which register in grooves 34 on the opposite sides of a track 36 that extends longitudinally relative to trailer body 14 and is fixed thereto. Similarly, plates 30 have outwardly extending flanges 38 at the upper end thereof which register with grooves 40 on opposite sides of a track 42 which extends parallel with track 36. It will be appreciated that there is sufficient clearance between the flanges and grooves to permit sliding movement of landing gear 20 along tracks 36 and 42.

The leg 24 of landing gear 18 includes an upper tubular member 44 which is fixed to plates 28. Telescoped within member 44 for sliding movement relative thereto is a lower tubular member 46. Rotatably journaled at the bottom end of member 46 is an axle 48 to which ground engaging wheels 50 are attached at opposite ends thereof. A nut 52 is disposed within member 46 at the upper end thereof and connected thereto by an suitable means, such as welding. A screw 54 threadably engages nut 52 and is rotatably journaled in a support plate 56 connected to the upper end of member 44. Connected to the portion of screw 54 which extends above support plate 56 is a bevel gear 58 which meshes with another gear as will be explained more fully shortly.

The leg 26 is constructed similar to leg 24 and includes an upper tubular member 60 within which a lower tubular member 62 is telescoped for sliding movement. A pair of ground engaging wheels 64 are connected to member 62 by means of an axle 66. Also connected to member 62 is a nut 68 that is threadably engaged by a screw 70 which is rotatably journaled in a support plate 72 connected to member 60. A bevel gear 74 is connected to the portion of screw 70 which extends upwardly past plate 72 and meshes with another gear as will be described shortly.

It will be understood that legs 24 and 26 are connected together for longitudinal movement by suitable cross bracing such as shown at 76 in FIG. 2, as well as by cross shaft 78.

The cross shaft 78 is rotatably journaled in side plates 28 and 30 and connected for rotation to a crank handle 80 by means of a pair of meshing spur gears 82 and 84 which are connected respectively to crank handle 80 and cross shaft 78. Connected to cross shaft 78 for rotation therewith and in mesh with bevel gear 58 is a bevel gear 86. A similar bevel gear 88 is connected to cross shaft 78 for rotation therewith and in mesh with bevel gear 74. At this point it will be seen that rotation of screws 54 and 70 is similarly caused through 78 through gear train 82, 84, and that respective rotation of screws 54 and 70 is similarly caused through bevel gear train 58, 86 and 74, 88. Rotation of screws 54 and 70 in one direction causes members 46 and 62 to be raised and rotation of screws 54 and 70 in the opposite direction causes members 46 and 62 to be lowered.

Referring specifically to FIGS. 3, 4, 5 and 6 it will be noted that the nearest plate 28 has been removed in order to expose the various gears. Also, it will be noted that in these figures crank handle 80 is shown connected directly to cross shaft 78. This is done merely to better show the various gears.

The mechanism 22 for actuating landing gear 18 longitudinally of the trailer will now be described in detail. In describing this mechanism reference will be made only to the portion which is associated with leg 24 of landing gear 20, but it will be understood that a duplicate portion which includes a spur gear 130 fixed to cross shaft 78 and in mesh with a worm gear 132 is associated with leg 26. The portion of the mechanism which is seen in FIGS. 3-6 includes a longitudinally extending tubular member 90 which is square in cross section and is secured to landing gear 20. A screw 92 is partially disposed within tubular member 90 and extends through a plate 94 at the end adjacent landing gear 20. A pair of collars 96 are connected to screw 92 on each side of plate 94 in order to prevent axial movement of screw 92, but permit rotation of it. Connected to the end of screw 92 at landing gear 20 is a worm gear 98 which meshes with a spur gear 100 that is fixed to cross shaft 78 for rotation therewith. At this point it will be seen that rotation of cross shaft 78 causes simultaneous rotation of screws 54 and 92. Screw 92 threadably engages a square nut 102 which is slidably disposed in member 90 and connected preferably by welding, to a tubular member 104 which has a square cross section. The tubular member 104 is telescoped within member 90 with sufficient clearance between them to permit sliding movement of one relative to the other. Tubular member 104 is supported by and slidably disposed in a generally U-shaped hanger bracket 106. Also, a plate 108 is secured to the outer end of member 104 and is slightly larger than member 104 so as to prevent the end of member 104 moving to the left, as seen in FIG. 3, past the rightmost edge of hanger bracket 106. The reason for preventing movement of the end of member 104 to the left past the edge of bracket 106 will be explained hereinafter in regard to the operation of the invention. A stop member 110 is fixed to trailer body 14, as shown, to limit the rearward longitudinal movement of nut 102 and member 104.

Figure 4:
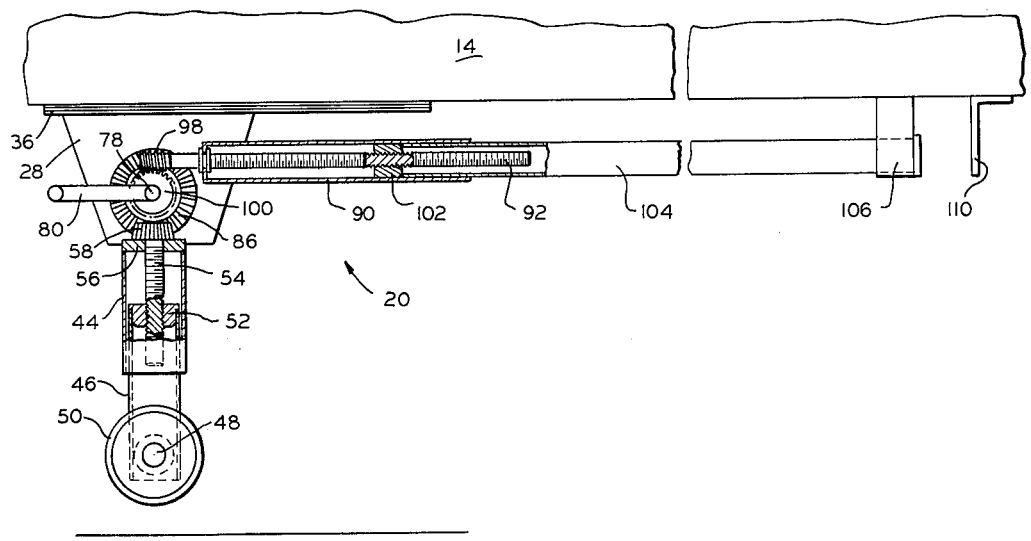

In order to better enable one to understand and practice our invention, we will now describe the operation of it. It will be assumed that it is desired to connect trailer 10 to a tractor and that the landing gear assembly 18 is in the position shown in FIGS. 1, 2 and 3. As the tractor unit backs up to the trailer for connection thereto it may be necessary to adjust the front end height of the trailer due to the fact that the fifth wheel height of the tractor may be different from the one which previously pulled the trailer. Therefore, rotation of crank handle 80 permits a vertical adjustment of the front end of the trailer 10 through the range of vertical travel of ground engaging wheel 50 as shown in FIG. 2. In actual practice this distance is about 5 inches, although it could be made more or less. Assuming now that the trailer and tractor are coupled together and the landing gear assembly is in the position shown in FIGS. 2 and 3, the operator then turns crank handle 80 in a direction to retract or raise the ground engaging wheels through rotation of screw 54 to cause nut 52 to move upwardly along it. Rotation of crank handle 80 also causes rotation of screw 92. Rotation of crank handle 80 in a direction to cause nut 52 to move upwardly along screw 54 causes rotation of screw 92 in a direction to cause nut 102 to move toward the left as viewed in FIG. 3. Since tubular member 104 is free to slide in bracket 106 initial rotation of screw 92 merely causes nut 102 to move toward the left from the position shown in FIG. 3 until plate 108 comes into abutment with the adjacent edge of bracket 106 (FIG. 4). Continued rotation of crank handle 80 results in a combined vertical and horizontal movement of the ground engaging wheels to finally bring them to the position shown in FIG. 5. At this point the ground engaging wheels are fully retracted or raised and the landing gear 20 is moved to the right end of track 36. It will be noted that the path of the ground engaging wheels during retraction of the landing gear initially was a purely vertical movement, and then was a combined vertical and rearward movement.

Figure 5:
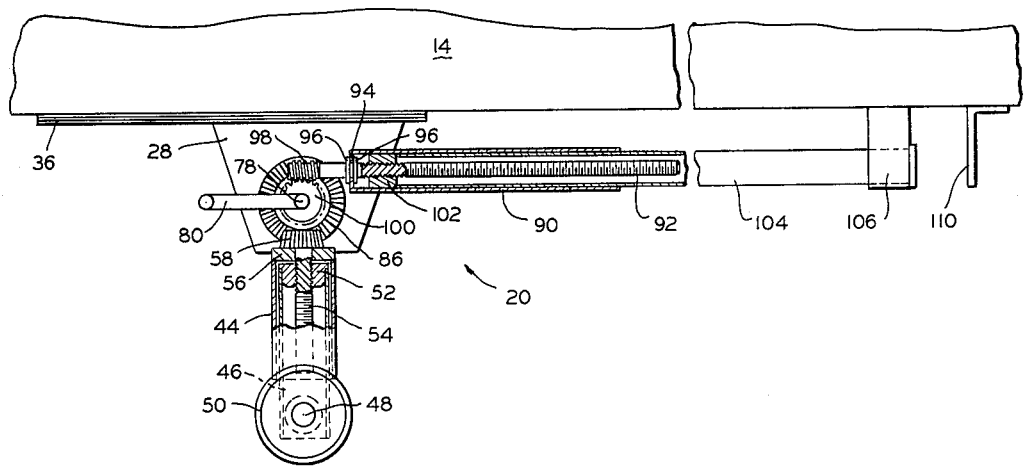
Figure 6:
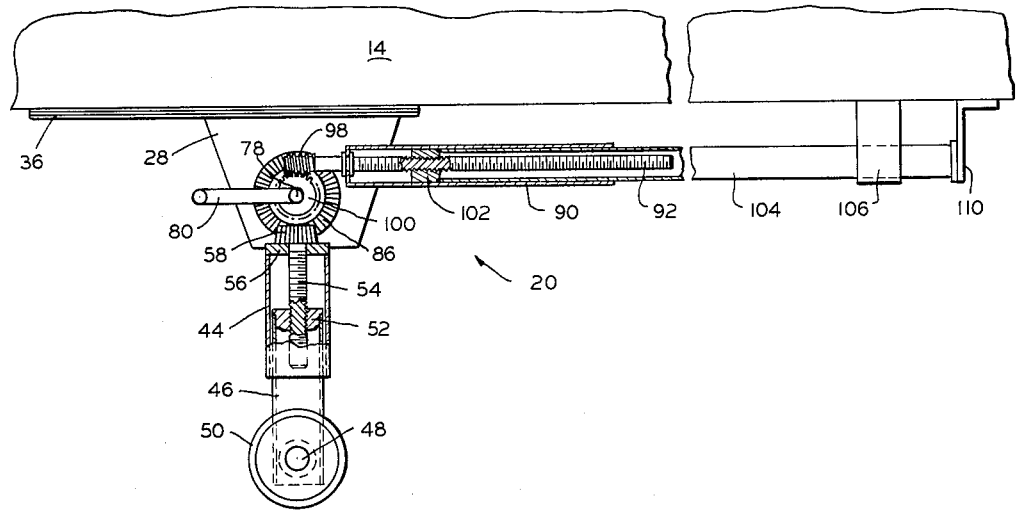

Now, if the operator desires to extend the ground engaging wheels into contact with the ground from the position shown in FIG. 5, the crank handle 80 is rotated in a direction opposite to the direction of rotation for retraction. The screw 54 rotates to cause nut 52 to move downwardly to lower or extend the ground engaging wheels. At the same time screw 92 is rotated in a direction which causes nut 102 to move toward the right as viewed in FIG. 5 until plate 108 comes into abutment with stop member 110 (FIG. 6). Continued rotation of crank handle 80 brings landing gear 20 and the ground engaging wheels to the position shown in FIG. 3.

While we have described our invention with reference to a single preferred embodiment, it will be understood that this embodiment is intended to be illustrative only and that various modifications and changes could be made to it by persons skilled in the art without departing from the scope and spirit of our invention. Consequently, the limits of our invention should be determined from the following appended claims when taken in conjunction with the prior art.

We claim:

1. For use with a semi-trailer, a landing gear assembly comprising a landing gear connected to the said semi-trailer for longitudinal movement relative thereto, the said landing gear including retractable ground engaging means and means for actuating the said ground engaging means to extend or retract, a nut connected to the semi-trailer for longitudinal movement relative thereto, a screw connected to the said landing gear and threadably engaging the said nut, means for connecting the said screw to the said actuating means so that operation of the said actuating means causes the said screw to rotate, and means for limiting the longitudinal movement of the said nut.

2. A landing gear assembly as set forth in claim 1 wherein the said limiting means includes a pair of longitudinally spaced apart stop members connected to the trailer.

References Cited by the Examiner
UNITED STATES PATENTS

| | | | |
|---|---|---|---|
| 1,898,854 | 2/1933 | Reid | 280—150.5 |
| 1,997,095 | 4/1935 | Allen | 254—86 |
| 2,150,701 | 3/1939 | Reid. | |

WILLIAM FELDMAN, *Primary Examiner.*

MILTON S. MEHR, *Examiner.*